UNITED STATES PATENT OFFICE.

HANS BUCHERER, OF BIEBRICH, GERMANY, ASSIGNOR TO THE FIRM OF KALLE AND COMPANY, AKTIENGESELLSCHAFT, OF BIEBRICH, GERMANY.

MANUFACTURE OF AZO COLORING-MATTERS CONTAINING A CARBAZOLE DERIVATIVE.

1,024,308. Specification of Letters Patent. Patented Apr. 23, 1912.

No Drawing. Application filed April 1, 1910. Serial No. 552,877.

*To all whom it may concern:*

Be it known that I, HANS BUCHERER, doctor of philosophy and chemist, subject to the King of Prussia, and residing at Biebrich-on-the-Rhine, in the German Empire, have invented certain new and useful Improvements in the Manufacture of Azo Coloring-Matters Containing a Carbazole Derivative, of which the following is a specification.

If phenyl-hydrazin or its nucleus substitution-products be allowed to react on the 2.5.7- or 2.8.6-amino-naphthol-sulfonic-acids (the two hetero-nucleo beta-amino-derivatives of 1-naphthol-3-sulfonic acid) in the presence of sulfites, or sulfur-dioxid, (compounds containing the sulfurous acid radical) new compounds are obtained which may be considered as carbazole derivatives of 1-naphthol-3-sulfonic acid (see German specification No. 208960 and also *Journal für Praktische Chemie*, vol. 77, page 403 *et seq.* and vol. 79, page 369 *et seq.*). The following example shows how such a carbazole derivative can be obtained from the I-acid (2-amino-5-naphthol-7-sulfonic acid): 239 grams I-acid are heated on the water bath, or reflux condenser, with 1500 grams of bisulfite solution of about 38° Baumé, 120 grams of caustic soda lye of 40° Baumé and 150 grams of phenyl-hydrazin until the I-acid has entirely disappeared, or only traces of it are left, this requiring from about 5 to 10 hours. The mixture is rendered strong alkaline, the excess of phenyl-hydrazin driven off by steam, and the mass acidified with sulfuric acid or hydrochloric acid, whereupon the sulfur-dioxid is driven off by boiling. In this way a solution of the carbazole compound is obtained, which has probably the following constitution:

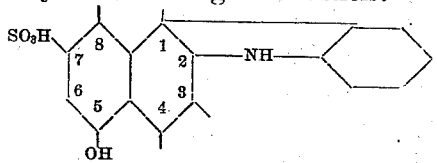

By evaporating to dryness the acid solution, the new acid separates in the form of an oil, which is very readily soluble in cold water. With aromatic amins (for example, anilin and para-toluidin) the carbazole derivative forms difficultly soluble salts, which are suited for its separation. By the formation of carbazole, the I-acid loses the capacity to couple in with diazo compounds in position 1; if furthermore, the hydroxyl group is closed by acid radicals (carbon dioxid, acetic acid, benzoic acids, and the like), the carbazole derivatives lose the capacity for forming azo dyes in a normal manner.

The production of the carbazole derivative from 2-amino-8-naphthol-6-sulfonic acid (gamma acid) and phenyl-hydrazin is effected in exactly the same manner. As already mentioned, in the condensations with I- and gamma-acid, the simplest phenyl-hydrazin can be replaced by other hydrazins, for instance ortho- and para-tolyl, or para-amino-phenyl-hydrazin, as well as their sulfonic acid and carboxylic acid or halogen derivatives, and the like. The carbazole derivative from gamma-acid and phenyl-hydrazin is somewhat more difficultly soluble in water than the corresponding compound from the I-acid and can therefore be partially precipitated from concentrated solutions by hydrochloric acid, or sulfuric acid. I have now discovered that these carbazole derivatives are suitable as components for the preparation of azo dyes; according to the action of mono-diazo compounds, tetrazo compounds or diazotized amido-azo compounds, azo dyes are obtained which contain one or more azo groups and whose shades vary within the widest limits according to the selection of the components.

Example 1. *a.* The diazo compound obtained from 10.7 kilograms of ortho-toluidin in the usual manner is caused to run into an alkaline solution containing 34 kilograms of the sodium salt of that carbazole derivative resulting from the combination of phenyl-hydrazin, bisulfite and 2-amino-5-naphthol-7-sulfonic acid. The coupling takes place immediately and is completed in a very short time. The separation of the dye is completed by salting out; it is then filtered, pressed and dried. The dyestuff dyes wool both in neutral and acid bath, as well as cotton in neutral to alkaline bath, in red shades fast to acids. *b.* If in the foregoing example, 35.5 kilograms of the sodium salt of that carbazole derivative be used, which is obtained from para-amino-phenyl-hydrazin, bisulfite and 2-amino-5-naphthol-7-sulfonic acid, then a dye is obtained which dyes cotton in shades having a tinge of blue capable of being further developed on the fiber in the usual manner, for instance by diazotizing the amino group of the phenyl-hydrazin nucleus and combining the obtained diazo compound with azo components. It is obvious that this process can be executed vice versa, i. e. by diazotizing at first the carbazole derivative from para-amino-phenyl-hydrazin, bisulfite and 2-amino-5-naphthol-7-sulfonic acid, then coupling with azo compounds and finally combining the resulting body with diazo compounds, in this example with ortho-toluidin, directly on the fiber or in absence of it.

In the example under a and b, the diazotized toluidin may be replaced by the diazo compound of other amins, such for instance as chlor-anilin, xylidin, acetyl-para-phenylene-diamin, naphthyl-amin, sulfanilic acid and the like. On the other hand the carbazole derivatives used can be replaced by such as are obtained by the action of substituted aryl-hydrazins on 2-amino-5-naphthol-7-sulfonic acid.

Example 2: If in the above example the solution of diazo-toluidin be replaced by the tetrazo compound prepared in the usual manner from 9.2 kilograms of benzidin and the process be continued as usual, a dye is obtained which dyes cotton in violet shades.

Example 3: The amino-azo compound obtained in the usual way from 19.5 kilograms of metanilic acid and 14.3 kilograms of alpha-naphthyl-amin is diazotized and filtered off. Then the diazo compound is introduced into a soda-alkaline solution which contains 34 kilograms of the carbazole derivative obtained in the hereinbefore described manner from the I-acid and phenyl-hydrazin. The solution is stirred for some time, then heated, and the dye separates out on the addition of common salt. It produces on wool, deep violet shades. In the same manner other secondary disazo dyes can be manufactured. The dye obtained from naphthionic acid and alpha-naphthyl-amin dyes on wool a violet blue shade. Similar properties are possessed by the dye obtained from 1-naphthyl-amin-3.6-disulfonic acid and alpha-naphthyl-amin. The dye from 1-amino-8-naphthol-3.6-disulfonic acid, alpha-naphthyl-amin and the carbazole derivative produces on cotton violet blue shades.

If in the above examples the carbazole derivatives of I-acid be replaced by the carbazole derivative of the 2.8.6-amino-naphthol-sulfonic acid (gamma acid) dyes are obtained which, compared with the azo dyestuffs obtained by combination of diazo components with the non-carbazolized γ-acid, are distinguished by the clearness of their shade and their fastness. Of especial interest are the dyes which are obtainable in the usual manner from the so-called para-diamins, such for instance as the dye from salicylic acid, benzidin and the carbazole compound of gamma-acid and phenyl-hydrazin, also the dye from the last-mentioned carbazole compound of gamma-acid, benzidin and resorcinol, or the corresponding dyes in which the resorcinol is replaced by meta-diamins or amino-phenols and their derivatives. The favorable influence of "carbazolization" is moreover very perceptible in mono- and secondary disazo dyes. Thus by diazotizing para-amino-salicylic acid and coupling it with the carbazole derivative from gamma-acid and phenyl-hydrazin, a dye is obtained which dyes wool from the neutral bath Bordeaux-red shades which can be developed in the usual manner by means of chromium salts. With the secondary disazo dyes, the increased affinity for cotton which is due to "carbazolization" is a most surprising one, for instance the dyestuff from amino-azo-benzo-sulfonic acid and the carbazole compound from gamma-acid and phenyl-hydrazin presents in neutral bath almost as great an affinity for cotton fiber as for wool, so that this dyestuff appears suitable for the production of powerful Bordeaux shades on half wool. Even the secondary disazo dye from naphthionic acid, 1.7-naphthyl-amin-sulfonic acid and the "carbazolized" gamma-acid possesses in a marked degree in spite of the three sulfonic groups, the properties of a cotton dyestuff.

The following examples illustrate the manner in which the process can be carried out:

Example I: The tetrazo compound obtained from 184 kilograms of benzidin is at first coupled with one molecule of salicylic acid in soda-alkaline solution. After the intermediate product is formed, a soda-alkaline solution of the calculated quantity of carbazolized gamma-acid is allowed to run into the reaction mass. The disazo dye is readily formed, it is separated from the reaction mixture almost completely and is worked upon in the usual manner. It dyes cotton fine and fast reddish-brown shades.

Example II: If the tetrazo compound obtained from one molecule of benzidin in soda-alkaline solution be first allowed to react on one molecule of "carbazolized" gamma-acid and if, after the intermediate product is formed, it be allowed to react on one molecule of resorcinol, a violet dye is obtained which can be developed to a fine, fast brown on the fiber by means of diazotized para-nitranilin. Dyes having quite similar properties are obtained when the resorcinol is replaced for instance by meta-phenylene-diamin or meta-toluylene-diamin, and the second coupling is effected in a weak solution of acetic acid. They dye cotton fiber direct reddish- and violet-brown shades respectively; by developing with diazotized para-nitranilin the tone becomes a markedly deeper brown and the fastness to washing is increased. The two other above named dyes from para-amino-salicylic acid or amino-azo-benzo-sulfonic acid are likewise obtained in a normal manner by the coupling of "carbazolized" gamma-acid in soda-alkaline solution.

What I claim is:

1. The process for producing azo coloring matters which consists in treating hetero-nucleo-beta-amino derivatives of 1-naphthol-3-sulfonic acid with aryl-hydrazins in presence of a compound containing the sulfurous acid radical and combining the obtained products with diazo compounds.

2. The process for producing azo coloring matters which consists in treating 2-amino-5-naphthol-7-sulfonic acid with an aryl-hydrazin in the presence of a compound containing the sulfurous acid radical and combining the obtained carbazole compound with a diazo compound.

3. Process for producing azo coloring matters which consists in treating 2-amino-5-naphthol-7-sulfonic acid with phenylhydrazin in presence of a compound containing the sulfurous acid radical and combining the obtained carbazole compound with diazotized xylidin.

4. As new compositions of matter the dyestuffs obtained from the carbazole derivatives of the hetero-nucleal beta-amino derivatives of 1-naphthol-3-sulfonic acid with diazo compounds constituting in dry state red to brown to black more or less crystalline powders, soluble in water with a yellowish-red to bluish-green color; soluble in concentrated sulfuric acid with a violet-blue to dark-green color, this solution separating, when diluted, brownish-red to bluish-green flakes, insoluble in benzene, ether, ligroin, and forming when treated with reducing agents as essential constituent the carbazole derivative of the 2-amino-1-oxynaphthalene-3-sulfonic acid.

5. As new compositions of matter the dyestuffs obtained from the carbazole derivatives of the 2-amino-5-naphthol-7-sulfonic acid with diazo compounds constituting in a dry state red to brown to black more or less crystalline powders, soluble in water with a yellowish-red to bluish green color; soluble in concentrated sulfuric acid with a violet-blue to dark-green color, this solution separating when diluted brownish-red to bluish-green flakes, insoluble in benzene, ether, ligroin, and forming when treated with reducing agents as an essential constituent the carbazole derivative of the 2.6-diamino-5-oxynaphthalene-7-sulfonic acid.

6. As a new composition of matter the dyestuff consisting of the diazo compound of ortho-xylidin with the carbazole derivative of the 2-amino-5-naphthol-7-sulfonic acid, constituting in dry state a crystalline brownish-red powder, soluble in water with bluish-red color from which solution the free acid is separated by hydrochloric acid in brownish-red flakes, soluble in alcohol or pyridin with orange-red color, soluble in sulfuric acid with violet-blue coloration which solution separates after diluting brownish-red flakes, insoluble in benzene or ether and being decomposed when treated with reducing agents into ortho-xylidin on the one hand and the carbazole derivative of the 2.6-diamino-5-oxy-naphthalene-7-sulfonic acid on the other hand.

In testimony whereof I have signed my name to this specification in the presence of two subscribing witnesses.

HANS BUCHERER.

Witnesses:
HERMANN PLISCHKE,
MAX DIERCHE.